May 7, 1940.                B. E. LENEHAN                2,199,640
CONTROL SYSTEM
Filed Sept. 28, 1937

WITNESSES:
C. J. Weller.
Joe Weber

INVENTOR
Bernard E. Lenehan.
BY
M. Crawford
ATTORNEY

Patented May 7, 1940

2,199,640

UNITED STATES PATENT OFFICE 2,199,640

CONTROL SYSTEM

Bernard E. Lenehan, Bloomfield, N. J., assignor to Westinghouse Electric & Manufacturing Company, East Pittsburgh, Pa., a corporation of Pennsylvania Application September 28, 1937, Serial No. 166,227

4 Claims. (Cl. 172—239)

My invention relates, generally, to control systems, and, more particularly, to systems for translating to one station a displacement proportional to a displacement at a remote point.

In systems for power distribution in which power is supplied to a customer at several different points, it is desirable that an indication of the total power consumed at the several widely separated points be given at a single point. In such systems, it is sometimes desirable that the total instantaneous power demand be indicated at a single point.

In other systems, it is desirable that one or more machines which are associated with a plurality of other machines be regulated in accordance with the sum of the total demands or movements of these other machines. It may be desirable, for instance, in a system in which a fluid reservoir is fed from a single source and is being drawn upon in varying amounts from each of several outlets, to vary the rate of feed from the single source in accordance with the sum of the amounts taken by the several outlets.

An object of the invention is to provide a reversibly rotatable member with control means which shall function to cause the member to duplicate in direction and amount the movements of a remotely situated reversibly rotatable device.

Another object of the invention is to provide a remotely controlled reversible device which shall function to follow the movement of another device independent of any ratchets and reciprocating parts.

Figure 1:
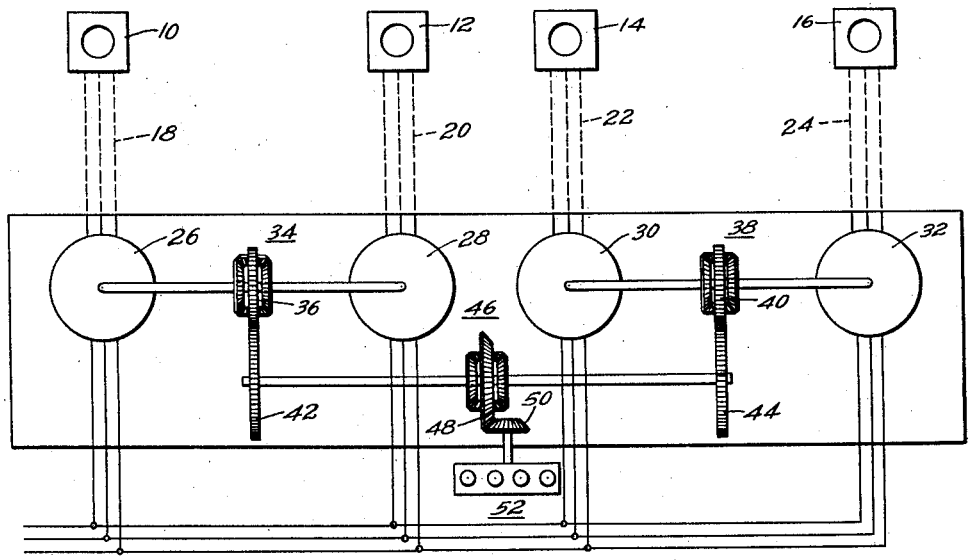
Figure 2:
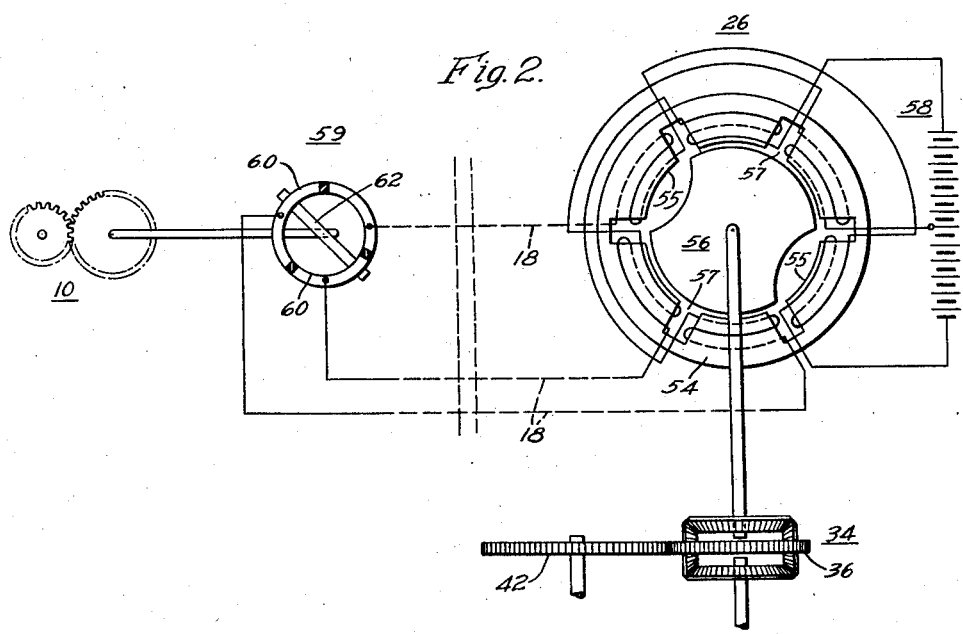

These and other objects of the invention will be apparent from the following detailed description taken in connection with the accompanying drawing, in which:

Figure 1 is a diagrammatic illustration of the cooperative relationships of the several elements of a single unit of my invention; and Fig. 2 is a system diagram showing the functioning of the units of Fig. 1 in a totalizing metering system.

In carrying out my invention, a receiver comprising a multi-pole stator having three sets of windings distributed thereover, acts upon an iron core. The three sets of windings are connected in circuit in successive pairs by a rotatable member whose motion it is desired to duplicate, the direction of rotation of the rotatable member determining the order of energization of the three sets of windings and, therefore, the direction of rotation of the iron core. The three sets of windings may be energized by three phase alternating current or by a single battery.

A differential gearing system adds and subtracts the forward and reverse movements of several of the receivers to produce a resultant movement proportional to the sum of the separate movements of the receivers.

Referring now to Figure 1 of the drawing, there are shown gauges or other indicating or measuring devices 10, 12, 14 and 16, each of them connected by circuits 18, 20, 22 and 24 to receiving devices 26, 28, 30 and 32, respectively. Each of the receiving devices 26, 28, 30 and 32 may be any device which will duplicate the movement of the indicating device to which it is connected at the remote station, but is preferably such a device as is described in detail hereinafter in connection with Fig. 2. Each of the receiving devices 26 and 28 is connected to drive one of the gears of a mechanical differential device 34, and the gear 36 of the differential device 34 will thereby receive a movement which is the net sum of the movements of the receiving devices 26 and 28. In a like manner, receiving devices 30 and 32 are connected as shown, to differential device 38 which produces a movement of gear 40 which is the sum of the movements of the receiving devices 30 and 32. The movements of the gears 36 and 40 are transmitted through gears 42 and 44, respectively, to the differential device 46 and the sum of the movements of the gears 36 and 40 is transmitted through the differential device 46 to the gears 48 and 50. The gear 50 drives a suitable meter 52 and imparts to the meter a movement which is the sum total of the difference between the forward and reverse movements of the gauges 10, 12, 14 and 16 at the remote stations.

In this manner, it will be seen that all movements of the gauges or indicating devices 10, 12, 14 and 16 whether they be forward or reverse movements, will effect the totalizing device 52 and the net sums of their movements will be indicated by the totalizing device 52.

The mechanism for translating the movement of the gauge or indicating devices 10, 12, 14 and 16 from the remote station to the differential devices at the central station is illustrated in detail in Fig. 2. Referring to Fig. 2, the receiving device 26 comprises a field core 54 which has six pole pieces 55. Each of the pole pieces has a winding disposed thereon with opposite pairs of windings connected together making three sets of field windings in all. An armature 56 has salient poles 57 the width of each of which is approximately the width of two adjacent field poles.

Two of the sets of field windings of the receiver 26 are connected, respectively, to the opposite ends of a battery 58 and the end of the third set of windings is connected to approximately the midpoint of the battery. The other ends of the three sets of windings are connected by the three conductors 18 each to one of three conducting segments 60 of a distributor 59 at the remote station. A conducting bar 62 is mounted to rotate coaxially of the conducting segments 60 and to bear upon the segments so that it will always connect a pair of the segments together, and in this way will progressively connect the ends of pairs of the field windings on the receiver 26 together as it rotates. The conducting bar 62 may be connected in any well known manner to be rotated by the gauge, meter or measuring device 10 in a forward or reverse direction in accordance with the direction and degree of rotation of the gauge. In this way it will be seen that parts of the three sets of field windings of the receiver 26 will be progressively connected together and energized, the direction and degree of progression of energization depending upon the direction and degree of movement of the gauge 10.

In the operation of the device, assuming that the conducting bar 62 is in the position shown, it will be seen that a circuit is completed through the two sets of field windings on the pole pieces 55 adjacent the armature poles 57 in the position in which the armature 56 is shown in the drawing. If now, the bar 62 is rotated in a clockwise direction, the next pair of field windings on the pole pieces 55 in the clockwise direction will be energized together with the windings immediately preceding them; the other pair of the three sets of field windings will be deenergized, thus causing the armature 56 to move ⅙ of a revolution in the clockwise direction. The armature will thus be stepped around as the conducting bar 62 is moved around by the gauge 10. In a like manner, if the gauge 10 moves the conducting bar 62 in the counter-clockwise direction, adjacent pairs of poles will be energized progressively in the counter-clockwise direction and the armature 56 will be caused to move in the counter-clockwise direction.

These movements of the armature 56 will be transmitted to one side of the differential device 34 and will cooperate with the movements of the other side of the differential device caused by movements of the receiving device which is connected to the other side of the differential device to produce a total movement of gear 36, which is the net sum of the movements of the receiving devices connected to the differential device.

It will be seen that the receiving device 26 will move at a speed which is just one-half the speed of motion imparted to the conducting bar 62 by the meter 10. The relation between the speeds of the gauge 10 and the receiving device 26 may be varied by varying the number of poles which comprises the field of the receiving device 26. For instance, if there were three poles on the field core 54, the speed of movement of the receiving device 26 would be the same as that of gauge 10. With six poles, we have seen that the speed of movement of receiving device 26 is one-half of the speed of the gauge 10, and if 12 poles were provided, the speed of movement of the receiving device 26 would be one-fourth the speed of the gauge 10.

In place of the battery 58 the source of power for the field windings of the receiving device 26 may be any source of three-phase alternating-current power with the respective ends of the three sets of field windings connected to the different phases of the source.

It will be seen that I have provided a simple, effective and inexpensive means for translating the motion of a gauge, indicator or any other movable element between two widely separated stations and for totalizing these motions to give an indication at a single station of the total of the net forward and reverse movements of a plurality of such gauges at the remote stations.

In compliance with the requirements of the patent statutes, I have shown and described herein a preferred embodiment of my invention. It is understood, however, that the invention is not limited to the precise construction shown and described but is capable of modification by one skilled in the art, the embodiment herein shown being merely illustrative of the principles of my invention.

I claim as my invention:

1. In a control system for producing movements at one station similar in direction and proportional in amount to the movements of a member at another station movable in forward and reverse directions, an armature at said one station comprising a member formed of magnetic material having salient poles, a set of three windings so disposed with respect to said armature as to effect movement of said armature when energized progressively in adjacent pairs, the direction of movement of said armature depending upon the direction of the progression of energization of said pairs, one end of each of two of said windings being connected to separate terminals of a source of electrical energy, one end of the other winding being connected to an intermediate terminal of the source of electrical energy, and means at said other station actuated by the said member at said other station for progressively connecting pairs of the other ends of said windings together, the direction of progression depending upon the direction of motion of said member.

2. In a remote control system, a translating device at a remote station comprising an armature and a plurality of spaced windings so disposed with respect to said armature as to cause the armature to rotate when said windings are energized in adjacent pairs progressively, a plurality of conductors each connecting one terminal of each of said windings with a control station, means at the remote station connecting a source of electrical energy across each pair of the other terminals of the said windings, and means at the control station for progressively electrically connecting adjacent pairs of said conductors together.

3. In a remote control system, a translating device at a remote station comprising an armature and three spaced windings so disposed with respect to said armature as to cause the armature to rotate when said windings are energized in adjacent pairs progressively, three conductors each connecting one terminal of each of said windings with a control station, means at the remote station connecting each of the other terminals of said windings to a separate one of the terminals of a three-phase source of power, and means at the control station for progressively electrically connecting adjacent pairs of said three conductors together.

4. In a remote control system, a translating device at a remote station comprising an armature and three spaced windings so disposed with respect to said armature as to cause the armature to rotate when said windings are energized in adjacent pairs progressively, three conductors each connecting one terminal of each of said windings with a control station, means at the remote station connecting the end terminals of an electric battery to two of the other terminals of said windings, means connecting the other terminal of the third winding to an intermediate terminal of the battery, and means at the control station for progressively electrically connecting adjacent pairs of said three conductors together.

BERNARD E. LENEHAN.